(12) United States Patent
Abramenko et al.

(10) Patent No.: US 11,875,986 B2
(45) Date of Patent: Jan. 16, 2024

(54) LASER-PUMPED LIGHT SOURCE AND METHOD FOR LASER IGNITION OF PLASMA

(71) Applicants: RnD-ISAN, Ltd, Moscow (RU); ISTEQ B.V., Eindhoven (NL)

(72) Inventors: Dmitriy Borisovich Abramenko, Moscow (RU); Robert Rafilevich Gayasov, Moscow (RU); Denis Alexandrovich Glushkov, Nieuwegein (NL); Yurii Borisovich Kiryukhin, Moscow (RU); Vladimir Mikhailovich Krivtsun, Moscow (RU); Aleksandr Andreevich Lash, Moscow (RU)

(73) Assignees: ISTEQ B.V., Eindhoven (NL); ISTEQ GROUP HOLDING B.V., Eindhoven (NL)

( * ) Notice: Subject to any disclaimer, the term of this patent is extended or adjusted under 35 U.S.C. 154(b) by 17 days.

(21) Appl. No.: 17/962,148

(22) Filed: Oct. 7, 2022

(65) Prior Publication Data
US 2023/0052481 A1     Feb. 16, 2023

Related U.S. Application Data

(63) Continuation-in-part of application No. 17/514,178, filed on Oct. 29, 2021, now Pat. No. 11,503,696, (Continued)

(30) Foreign Application Priority Data

Mar. 5, 2020 (RU) ............................ RU2020109782
Oct. 8, 2021 (RU) ............................ RU2021129398
Sep. 8, 2022 (RU) ............................ RU2022123852

(51) Int. Cl.
H01J 65/00       (2006.01)
H01S 3/23        (2006.01)
(Continued)

(52) U.S. Cl.
CPC .............. *H01J 65/00* (2013.01); *H01J 61/16* (2013.01); *H01S 3/092* (2013.01); *H01S 3/1115* (2013.01); *H01S 3/23* (2013.01)

(58) Field of Classification Search
CPC ................................. H05H 1/24; H05G 2/008
See application file for complete search history.

(56) References Cited

U.S. PATENT DOCUMENTS 5,331,993 A * 7/1994 Billbury ................. B63B 17/02
                                                      114/361
5,379,315 A * 1/1995 Meinzer ................. H01S 3/223
                                                      372/101

* cited by examiner

*Primary Examiner* — Anne M Hines
(74) *Attorney, Agent, or Firm* — Nadya Reingand

(57) ABSTRACT

The light source contains a gas-filled chamber with a plasma sustained by a focused beam of a continuous wave laser. The means for plasma ignition is a solid-state laser system which generates two pulsed laser beams: in a free running mode and in a Q-switched mode. The solid-state laser system contains single active element and its optical cavity is equipped with a Q-switch overlapping only part of a cross section of the intracavity laser beam. One pulsed laser beam provides an optical breakdown after which another pulsed laser beam ignites the plasma, the volume and density of which are sufficient for stationary sustenance of the plasma by the focused beam of the continuous wave laser. EFFECT: simplification of the design of the light source, increase of its reliability and ease of use, creating on this basis of powerful electrode-free high-brightness broadband light sources with high spatial and energy stability.

14 Claims, 2 Drawing Sheets

Related U.S. Application Data which is a continuation-in-part of application No. 17/180,063, filed on Feb. 19, 2021, now Pat. No. 11,191,147, which is a continuation-in-part of application No. 16/986,424, filed on Aug. 6, 2020, now Pat. No. 10,964,523, which is a continuation-in-part of application No. 16/814,317, filed on Mar. 10, 2020, now Pat. No. 10,770,282.

(51) Int. Cl.
*H01J 61/16* (2006.01)
*H01S 3/1115* (2023.01)
*H01S 3/092* (2006.01)

LASER-PUMPED LIGHT SOURCE AND METHOD FOR LASER IGNITION OF PLASMA

CROSS-REFERENCE TO RELATED APPLICATIONS

This patent application is a Continuation of U.S. patent application Ser. No. 17/514,178, filed on Oct. 29, 2021, currently allowed, which claims priority to Russian patent application RU2021129398 filed Oct. 8, 2021, which is a Continuation-in-part of the U.S. patent application Ser. No. 17/180,063 filed Feb. 19, 2021, currently U.S. Pat. No 11,191,147 and also it claims priority to Russian patent application RU2022123852 filed on Sept. 9, 2022 all of which are incorporated herein by reference in their entireties.

FIELD OF INVENTION

The invention relates to broadband light sources with a continuous optical discharge (COD), as well as to a method for starting the ignition of a plasma sustained by continuous laser radiation.

BACKGROUND OF INVENTION

One of the challenges related to creation of high-brightness COD-based light sources relates to the reliable start-up ignition of the COD.

As known, for example, from the U.S. Pat. No. 9,368,337, issued on Jun. 14, 2016, in laser-pumped plasma light source two pin electrodes, located on the axis of a transparent chamber, between which an arc discharge is generated for a short time, are used for starting plasma ignition. The beam of CW laser is focused in the chamber center, in the gap between the two electrodes. The source is characterized by high brightness and ease of use. The latter is largely due to the fact that quartz chambers or bulbs with two electrodes, containing gas, in particular, high-pressure Xe (10 atm or higher), are commercially available products.

However, the relatively cold electrodes located near the high-temperature plasma region produce disturbances of convective gas flows in the chamber and, as a result, impair spatial and energetic stability of the laser-pumped plasma light source. Besides, the presence of electrodes near the radiating plasma region is characterized by "dead" spatial angles restricting the exit of plasma radiation. Also, electrode material sputtering may result in decreased transparency of the bulb walls and, correspondingly, to the light source degradation over time.

This drawback is largely overcome in the high-brightness broadband light source known from the U.S. Pat. No. 9,357,627, issued on May 31, 2016. In its embodiment, after COD ignition the laser beam focus area and, correspondingly, the radiating plasma region, are moved from the gap between the igniting electrodes towards the chamber wall. By choosing the relative position of the laser beam, chamber axis and radiating plasma region, a high spatial and power stability of the broadband laser-pumped plasma light source is provided.

However, the need to move the radiating plasma region complicates the light source design and operation. Besides, it makes using the sharp focusing of the laser beam more difficult, which may limit achievement of the high brightness of the light source. The disadvantages of an electrode-containing chamber also include the complex technology for sealing the metal/glass joint and the complex chamber shape producing a concentration of stresses which result in lower strength of the chamber when operating at high gas pressures.

The above-mentioned disadvantages are absent in the electrode-free laser-pumped plasma light source known from the patent application JPS 61193358 issued on Aug. 27, 1986, where the laser is used both for starting plasma ignition and for COD sustenance.

However, the threshold power of laser radiation required for plasma ignition is usually from about ten to several hundreds of kilowatts or higher, while the laser radiation intensity sufficient for COD sustenance is typically just a few tens of Watts. Thus, using the same laser with a high output power both for plasma ignition and COD sustenance either results in reduced lifetime of the light source (when the full laser power is used for COD sustenance), or is redundant, expensive and, therefore, impractical if only a fraction of the full laser power is used to sustain the COD.

U.S. Pat. No. 10,057,973, issued on Aug. 21, 2018, proposes to overcome this challenge by using a single CW laser with the power of less than 250 Watts and a wavelength of less than 1.1 pm. It is suggested that COD ignition and sustenance is provided by means of sharp focusing of CW laser beam with a focal area cross size of less than 1-15 microns, and a focal area length of 6 microns or lower.

However, this solution is not versatile, since the requirements to laser focusing are very high and do not guarantee high functional reliability of the proposed light source. Besides, the laser power of around 250 Watts supplied to the light source may be too high for a variety of applications.

These disadvantages are overcome in the light source known from patent FR2554302 issued on May 03, 1985, where a focused pulsed laser beam intended for initial plasma ignition or optical breakdown is used as a means for plasma ignition and a CW laser is used for COD sustenance. The above-mentioned approach eliminates the problem of the laser-pumped plasma light source lifetime.

However, sharp focusing of laser beams is required for both plasma ignition and ensuring high brightness of laser-pumped plasma light source. Thus, an extremely precise adjustment is needed of the pulsed and CW laser focusing areas. This results in a complexity and poor reliability of laser ignition, making stable COD ignition in a high-brightness light source problematic.

These disadvantages are partially overcome in the light source known from the U.S. Pat. No. 10,244,613, issued on May 25, 2017. In an embodiment of the invention the beams of one or several igniting lasers and beams of one or several CW lasers, intended for COD sustenance, are introduced into an optical fiber used for delivering the radiation of the said lasers to a condensing or focusing optical system. In the said device, superposition of the focusing areas of the pulsed lasers and of CW lasers is achieved, if the wavelengths of the said lasers are similar.

However, if the pulsed and CW laser wavelengths are different, their focusing areas diverge due to chromatic aberrations. Besides, transmitting laser pulses with the high power used for reliable COD ignition (hundreds of kW) through an optical fiber may result in optical fiber destruction, which determines the disadvantages of this solution.

The closest technical solution is the light source known from patent RU 2732999, issued on Sep. 28, 2020, in which the plasma ignition means is a solid-state laser system generating two laser beams focused in the chamber. The laser beam generated in a Q-switched mode is designed to optically breakdown the gas. At the same time, the laser beam generated in free running mode, which is not capable of optical breakdown by itself, is designed to create after optical breakdown a plasma, the volume and density of which are sufficient for its stationary maintenance by a continuous wave laser. In other words, the joint effect of two laser beams generated in a giant pulse mode and free running leads to the formation of a plasma, the burning of which is picked up by a CW laser. Thus, reliable electrodeless ignition of a laser-pumped plasma light source is provided. The invention makes it possible to create the most high-brightness broadband light sources with high spatial and energy stability and collection of plasma radiation in a large spatial angle.

However, the presence of two active elements complicates the solid-state laser system and the light source, reduces the reliability and convenience of its operation. When using a common optical cavity of a pulsed laser system, there are rather strict requirements for parallelism of the ends of the two active elements made in the form of rods. Also problematic for obtaining two parallel beams is the difference in thermal effects in different rods. Besides, the use of two pulsed laser beams separated in space complicates their introduction into the chamber together with a CW laser beam, requiring the use of a dichroic mirror. The latter, in turn, leads to the necessity of using polarized laser radiation passing through the dichroic mirror to reduce reflection losses, and imposes restrictions on the choice of wavelengths of ignition and continuous laser radiation, making it difficult to use pulsed and CW lasers with close wavelengths of radiation.

SUMMARY

The technical problem to be solved by the invention relates to the creation of methods and devices for highly reliable laser ignition of continuous optical discharge and to develop high brightness highly-stable laser-pumped plasma light sources on the basis thereof.

The technical result of the invention consists in ensuring simplify the design of the light source, increase its reliability and ease of use and in creating electrode-free high-brightness broadband light sources with the high spatial and power stability on that basis.

Achievement of the purpose is possible by means of the laser-pumped plasma light source comprising: a gas-filled chamber, at least part of which is optically transparent, a region of radiating plasma sustained in the chamber by a focused beam of a continuous wave (CW) laser, and means for plasma ignition.

The light source is characterized in that the means for plasma ignition is a solid-state laser system generating two pulsed laser beams, that are focused into the chamber; one beam of said two pulsed laser beams is generated in a free running mode and another pulsed laser beam is generated in a Q-switched mode.

The solid-state laser system contains single active element, radiation source for pumping the active element and optical cavity, that provides multiple passage of an intracavity laser beam through the active element; the optical cavity is equipped with a Q-switch installed on the path of the intracavity laser beam so that the Q-switch overlaps only part of a cross section of the intracavity laser beam.

In a preferred embodiment of the invention, Q-switch (14) is a saturable absorber made of a chromium doped yttrium aluminum garnet crystal $Cr^{4+}$:YAG.

In a preferred embodiment of the invention, Q-switch overlaps a small part of the cross section of the intracavity laser beam, no more than 30% of its area.

In a preferred embodiment of the invention, pulsed laser beams and a beam of CW laser are focused into the chamber by a focusing optical element and the beam of CW laser directed at the focusing optical element does not intersect the pulsed laser beams, directed at the focusing optical element.

In a preferred embodiment of the invention, a deflecting mirror is mounted on the path of the beam of the CW laser outside the path of the pulsed laser beams.

In a preferred embodiment of the invention, a deflecting mirror is mounted on the path of passage of pulsed laser beams outside the path of passage of the beam of the CW laser.

In a preferred embodiment of the invention, output power of CW laser, sufficient to ignite and sustain the radiating plasma, is no more than 30 watts.

In a preferred embodiment of the invention, an axis of the focused beam of the CW laser is directed vertically upwards or close to the vertical, at an angle of no more than 10 degrees from it.

In a preferred embodiment of the invention, a density of gas particles in the chamber is less than $90 \cdot 10^{19}$ $cm^{-3}$, which corresponds to a gas pressure at room temperature of 33 atm, and a temperature of an inner surface of the chamber is not less than 600 K.

In a preferred embodiment of the invention, the temperature of the inner surface of the chamber is not more than 900 K, and the density of gas particles is not less than $45 \cdot 10^{19}$ $cm^{-3}$, which corresponds to a gas pressure at room temperature of 16.5 atm.

In a preferred embodiment of the invention, the radiating plasma is characterized by high spectral brightness, more than 50 $MW/(mm^2 \cdot nm \cdot sr)$, and by a low relative instability of brightness $\sigma$, less than 1%.

In a preferred embodiment of the invention, the gas belongs to a group of inert gases, including xenon, krypton, argon, neon or mixtures thereof.

In another aspect, the invention relates to a method for plasma ignition in a laser-pumped plasma light source comprising: directing a focused beam of continuous wave (CW) laser into a gas filled chamber, at least part of which is optically transparent, plasma ignition and stationary sustenance of a radiating plasma by focused beam of CW laser The method is characterized in that the plasma is ignited by a solid-state laser system with single active element, which generates two parallel pulsed laser beams focused into the chamber; one beam of said two pulsed laser beams is generated in a free running mode, and another pulsed laser beam is generated in a Q-switched mode by an installed in an optical cavity Q-switch, overlapping only part of the cross section of the intracavity laser beam.

In a preferred embodiment of the invention, the pulsed laser beams and a beam of the CW laser are focused into a region intended for sustaining the radiating plasma by a focusing optical element and the beam of the CW laser directed at the focusing optical element does not intersect the pulsed laser beams directed at the focusing optical element.

When performing a light source in the proposed form, due to the use of laser systems with only one active element for plasma ignition, the number of elements of the laser system decreases, the design is simplified as much as possible and the reliability of the means for laser plasma ignition and the radiation source increases. In comparison with the prototype, the problems associated with combining the foci of two pulsed laser beams due to the different prismatic of the two active elements and with the possible separation of the two active elements due to thermal effects are eliminated.

Along with this, the maximum convergence in space of two pulsed laser beams, due to their generation by one active element, allows not to use a dichroic mirror to inject pulsed and continuous laser beams into the chamber, eliminates the need to use polarized laser radiation passing through a dichroic mirror.

In addition, the use of a passive Q-switch in the form of a saturating absorber in the form of a $Cr^{4+}$:YAG crystal, in particular, in the form of a plate, provides automatic operation of a two-beam laser system.

All this also simplifies the design of the radiation source, increases its reliability and ease of operation.

Reliable ignition of a continuous optical discharge is achieved due to the following factors. Optical breakdown is provided by a laser beam generated in the Q-switch mode. However, the ignition of COD with only one laser beam is problematic. One of the reasons is the difficulty of combining the focus area of a CW laser with the optical breakdown area, the size of which is usually very small and does not exceed about 50 µm. Even if the focus areas of the pulsed and continuous laser beams are combined, the ignition of COD with only one laser beam is still difficult to achieve. This is due to the fact that the optical breakdown generated by laser radiation has explosive properties. Explosive-type processes, in particular shock waves, can lead to the quenching of an optical discharge sustained by a CW laser of low power, usually not exceeding 300 watts. In accordance with the invention, this problem is solved by the fact that a laser beam generated in the free running mode and not capable of performing an optical breakdown by itself provides plasma ignition after an optical breakdown by a laser beam generated in the Q-switched mode. The parameters of the laser beam generated in the free running mode are chosen so that the optical discharge sustained by it is itself free from explosive phenomena and at the same time resistant to disturbances caused by the previous optical breakdown. Along with this, the laser beam generated in the free running mode provides a volume and density of plasma sufficient for its reliable stationary maintenance by a CW laser of relatively low power, up to 30 watts, after the end of the igniting laser pulse is turned off.

Thus, reliable electrodeless ignition of a continuous optical discharge is achieved. The elimination of electrodes reduces disturbances of convective gas flows near the emitting plasma region, simplifies the chamber, allowing to optimize its design to reduce the turbulence of convective gas flows and minimize optical aberrations, in particular, when plasma radiation is output through transparent parts of the chamber, as well as to increase the spatial angle of plasma radiation collection.

In accordance with the invention, continuous generation of plasma radiation with high spectral brightness, more than 50 MW/(mm$^2$·nm·sr), and relative brightness oinstability, less than 0.1%, is achieved by the fact that the density of gas particles in the chamber should be as low as possible, and the temperature of the inner surface of the chamber during operation should be as high as possible when ensuring the gas pressure in the chamber is about 50 atm. and more.

All this makes it possible to create the most high-brightness broadband light sources with a large spatial angle of plasma radiation collection, characterized by the highest spatial and energy stability.

The specified objects, features and advantages of the invention, as well as the invention itself, will be more understandable from the subsequent description of the implementation options of the invention, illustrated by the attached drawings.

BRIEF DESCRIPTION OF DRAWINGS

The technical essence and principle of operation of the proposed device are explained by drawings on which.

In the drawings, the matching elements of the device have the same reference numbers.

These drawings do not cover and, moreover, do not limit the entire scope of options for implementing this technical solution, but are only illustrative examples of particular cases of its implementation

DETAILED DESCRIPTION OF THE PREFERRED EMBODIMENTS

This description is provided to illustrate how the invention can be implemented and in no way to demonstrate the scope of this invention.

Figure 1:
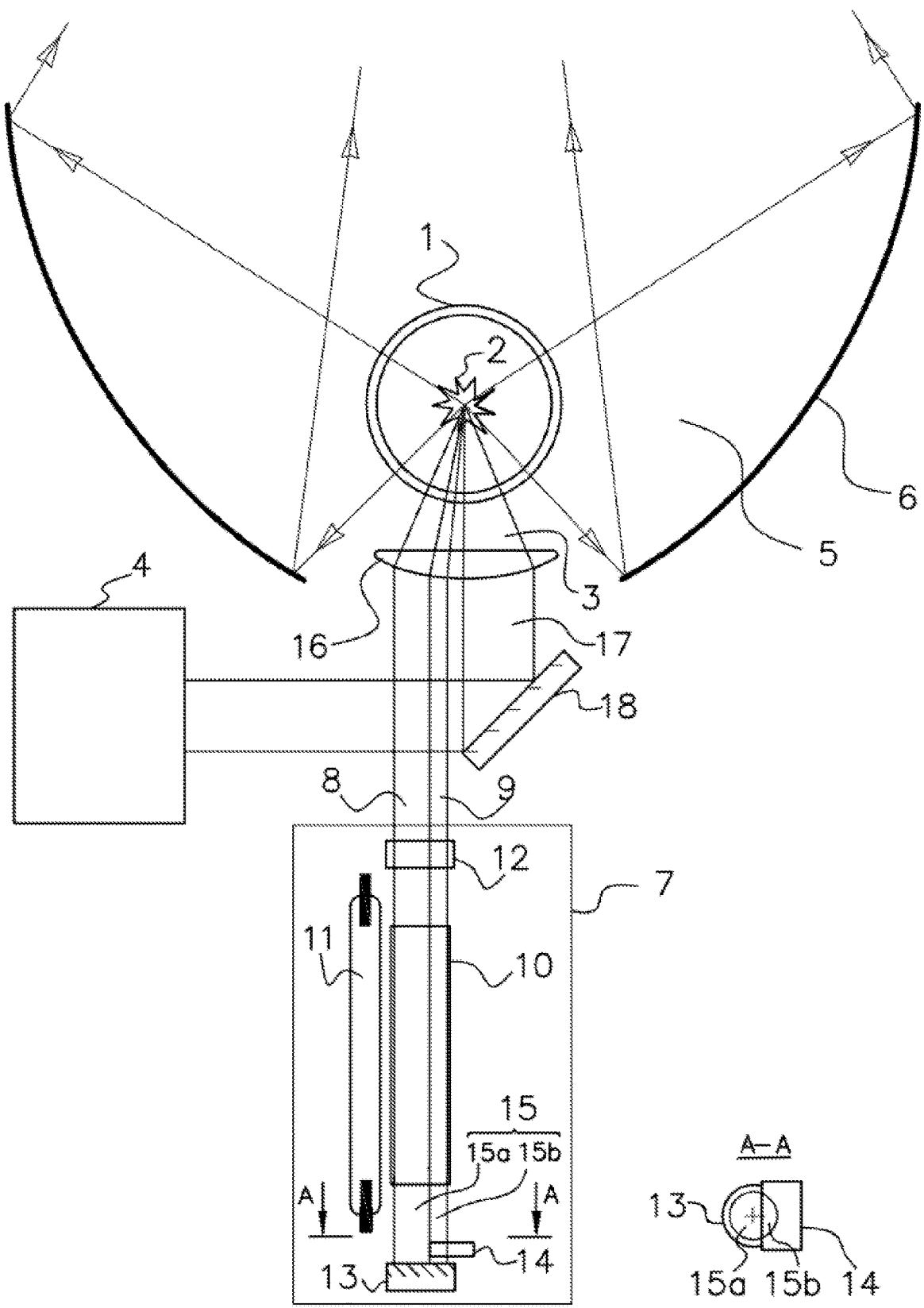
FIG. 1—schematic representation of a light source with a pulsed solid-state laser system for plasma ignition and a cross-section of a plasma laser ignition device in the area of its optical cavity, FIG. 2—characteristic oscillogram of the radiation intensity of a solid-state laser system used for plasma ignition.

In accordance with the example of the invention (FIG. 1), a laser-pumped light source contains a camera 1 filled with high-pressure gas. At least part of chamber 1 is optically transparent. FIG. 1. shows a variant of chamber made of an optically transparent material, for example, fused quartz. In chamber 1 there is a region of radiating plasma 2 sustained in the chamber by a focused beam 3 of a CW laser 4.

At least one plasma radiation beam 5, directed at the optical radiation collection system 6 and intended for further use, exits the chamber 1. The optical radiation collection system 6, which may include an axisymmetric ellipsoidal mirror (FIG. 1), forms a plasma radiation beam transported, for example, via optical fiber or a system of mirrors to an optical system using broadband plasma radiation.

The light source also contains a plasma ignition device, which uses a solid-state laser system 7, made with the function of generating two laser beams 8, 9, which are focused into the chamber 1. One of the two laser beams 8 is generated in the free running mode, and the other laser beam 9 is generated in the Q-switched mode. In this case, the solid-state laser system contains only one active element 10, a radiation source 11, for example, a compact pulsed xenon lamp for pumping the active element and an optical cavity with mirrors 12, 13 and with a Q-switch 14. The optical cavity provides multiple passage of the intracavity laser beam 15 through the active element 10. In this case, the Q-switch 14 is installed on the path of the intracavity laser radiation flux 15, so that it covers only part of the aperture or cross section of the intracavity laser beam 15.

One part of the intracavity laser beam 15a does not have a Q-switch 14 in its path, which leads to the generation of a laser beam 8 in the free running mode.

One part of the intracavity laser beam 15b does not have a Q-switch 14 in its path, which leads to the generation of a laser beam 9 in the free generation mode.

As can be seen from the cross section A-A of the solid-state laser system 7 in FIG. 1, the cross sections of the intracavity laser beams 15a and 15b and the corresponding cross sections of the laser radiation beams 8, 9 coming out of the optical cavity, in the embodiment of the invention have the form of segments of a circle of different cross-sections.

The laser beam 8, generated in the Q-switched mode, and the laser beam generated in the free running mode, 9, are focused into the chamber 1, namely into the chamber area designed to sustain the emitting plasma.

Laser beam 8, generated in Q-switched mode, is designed for initial plasma ignition or optical breakdown in the chamber 1. The laser beam 9 generated in the free running mode is designed to ignite the plasma after an optical breakdown carried out by a laser beam generated in the Q-switched mode, 8. In this case, the Q-switch 14 preferably covers only a small part 15b of the cross section of the intracavity laser beam 15, preferably no more than 30% of its area, in order to ensure an optimal, from the point of view of plasma ignition, the energy ratio of laser beams 8 and 9.

The laser beam 10 generated in the free running mode is designed to ignite the plasma after an optical breakdown carried out by a laser beam generated in the Q-switched mode, 8. In this embodiment of the invention, the generation of pulsed laser radiation in a solid-state laser system 7 is carried out at a wavelength of $\lambda_1$=1.064 µm.

The Q-switch 14 can be passive, made of orthotropic material and represent a saturating absorber, for example, in the form of an alumoittrium garnet crystal doped with chromium: $Cr^{4+}$:YAG. The Q-switch 14 can be made in the form of a plate, not limited only to this option. In other embodiments of the invention, the Q-switch 14 may be active.

In the preferred embodiment of the invention, focusing of all laser beams into the chamber area intended to sustain, the emitting plasma 2 is carried out by a single focusing optical element 16, for example, in the form of a collecting lens 16, not limited to this option only.

In the embodiment of the device shown in FIG. 1, a CW laser beam 17 is directed into the chamber using a rotary mirror 18 installed outside the pathways of pulsed laser beams 8, 9. Pulsed laser beams 8, 9 can also be directed into the chamber using another rotary mirror installed outside the beam path directly In these embodiments of the invention, the CW laser beam 17 directed at the focusing optical element 16 does not intersect the beams 8, 9 of the solid-state laser system, also directed at the focusing optical element 16.

In this embodiment of the invention, the known limitations associated with the use of a dichroic mirror are removed.

The method of plasma ignition in a laser-pumped plasma light source is implemented as follows. The focused beam 3 of a CW laser 4 is directed, for example, using a fully reflective rotary mirror 18, into a chamber 1 with a high-pressure gas, FIG. 1. Xenon or other inert gases and their mixtures, including with metal vapors, for example, mercury, and various gas mixtures, including halogen-containing ones, are used as a highly efficient plasma-forming medium.

The starting ignition of the plasma is provided by a solid-state laser system 7 with one active element 10. After switching on the radiation source 11, designed for pulsed pumping of the active element 10, two parallel laser beams 8, 9 are generated, focused into the chamber, into the area designed to sustain, the emitting plasma 2. In this case, one pulsed laser beam 8 is generated in the free running mode, and another pulsed laser beam 9 is generated in the Q-switched mode by using a Q-switch 14 installed in a optical cavity with mirrors 12, 13, providing multiple passage of the laser radiation flux or intracavity laser beam 15 through the active element 10. The Q-switch 14 is installed on the path of the intracavity laser beam 15 so that it covers only part of the cross section of the intracavity laser beam 15b. In this case, the pulsed laser beam 9 generated in the Q-switch mode is used to provide optical breakdown, after which the pulsed laser beam 8 generated in the free running mode is used to ignite plasma, the volume and density of which are sufficient for stationary plasma maintenance by a focused beam 3 of a CW laser 4.

In stationary mode, high-brightness broadband radiation is output from the region of the emitting plasma 2 of a continuous optical discharge by at least one beam 5 of useful plasma radiation exiting through the optically transparent parts of the chamber 1 and intended for further use.

In the example of the invention, the gas pressure Xe in the chamber is 30 atm at room temperature; the wavelength of the CW laser is $\lambda_{CW}$=0.808 µm, and its power varies from 30 to 100 watts.

Figure 2:
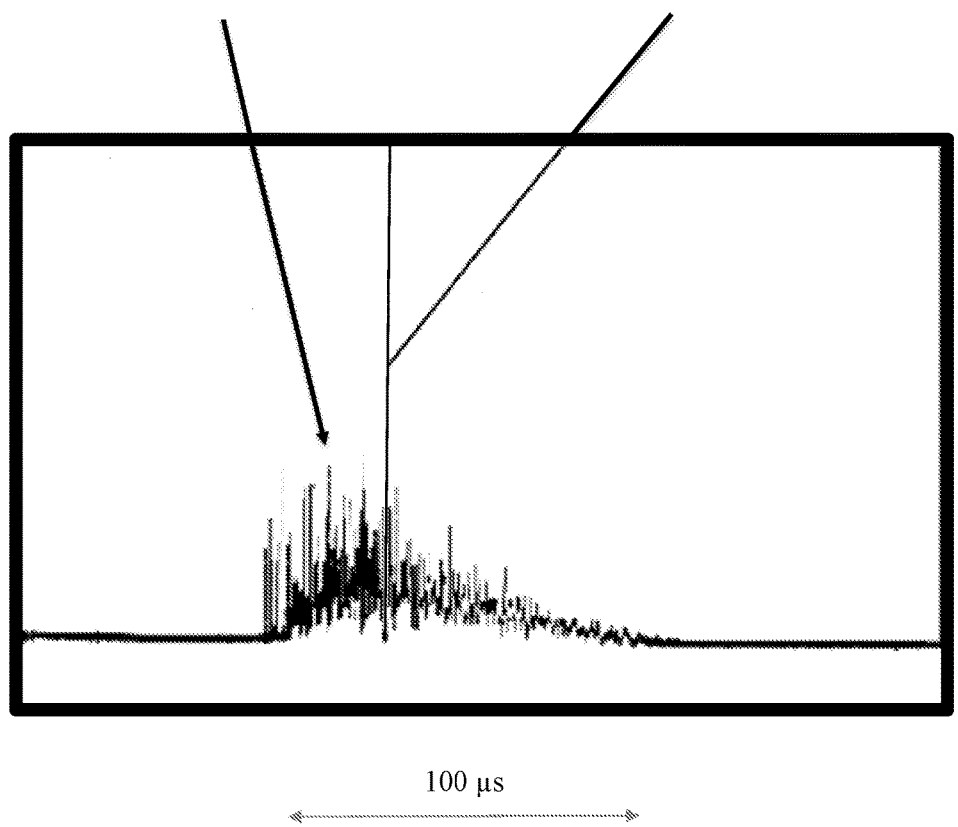

The characteristic time dependence of the power of laser radiation generated by a solid-state laser system is shown in FIG. 2. In this example, the energy of the laser beam generated in the peak free running mode is about 150 mJ, the duration is about 100 microseconds, the wavelength of the radiation is $\lambda_1$=1,064 µm. Generation in the mode with passive Q-switched mode occurs with a time delay and is characterized by a laser pulse energy of 3 mJ at its duration of 20 ns. The optical breakdown plasma has a characteristic size of 50-100 µm.

The optical breakdown mode does not provide reliable ignition of a continuous optical discharge. Therefore, after optical breakdown, a plasma is ignited by a laser beam generated in the free running mode, the volume (up to 1 $mm^3$) and density (over $10^{18}$ $cm^{-3}$) of which are sufficient for stationary plasma maintenance by a focused beam of a CW laser. Preferably, the laser beam emission pulse generated in the free running mode ends no earlier than 50 microseconds after the end of the laser beam emission pulse generated in the Q-switched mode, as illustrated in FIG. 2. A time of about 50 microseconds ensures the attenuation of disturbances from optical breakdown and the evolution of the plasma size and density to values sufficient for stationary plasma maintenance by a focused beam of a CW laser of relatively low power.

Other embodiments of the invention are aimed at further improvement of a laser-pumped plasma light source.

Since the radiation power of the solid-state laser system 7 when generating a giant pulse does not allow the use of optical fiber for transporting its radiation, which may be damaged, in the embodiments of the invention, only a CW laser has a fiber-optic radiation output (not shown).

At the same time, the output of CW laser radiation 4 is preferably carried out in an optical fiber (not shown). At the output of the optical fiber, an expanding laser beam is directed at a collimator (not shown), after which an expanded parallel beam of a CW laser is directed at a focusing optical element 16, for example, in the form of an aspherical collecting lens. The focusing optical element 16 provides sharp focusing of the beam 3 of the CW laser 4, necessary to ensure high brightness of the light source.

Due to the laser ignition of the plasma and the absence of igniting electrodes, in the preferred versions of the invention, the output of the beam 5 of useful plasma radiation from the chamber along all azimuths, FIG. 1. This means that in the azimuthal plane passing through the region of the emitting plasma 2 perpendicular to the axis of the beam 3 of the CW laser, the useful plasma radiation exits along all azimuths from 0 to 360 degrees. In preferred embodiments of the invention, a flat opening angle (in FIG. 1—in the plane of the drawing) of the beam 5 of the useful plasma radiation is at least 90°. This means that the output of the useful plasma radiation beam 5 from chamber 1 to the radiation collection system 6 is carried out at a spatial angle of at least 9 sr or more than 70% of the total solid angle.

In the embodiment, the axis of the focused beam 3 of a CW laser is directed vertically upwards, that is, against gravity, or close to the vertical, within ±10° of it. Preferably, the chamber 1 is axisymmetric and the axis of the focused beam 3 of the CW laser is aligned with the axis of symmetry of the camera. When performed in the proposed form, the greatest stability of the radiation power of a laser-pumped light source is achieved.

In accordance with the invention, in the mode of sustaining a radiating plasma, the temperature of the inner surface of the chamber is in the range from 600 to 900 K or higher, if a higher temperature does not have a noticeable negative effect on the strength of the chamber and its transparency. The positive effect achieved by the invention is due to the fact that for a given amount of gas in a given volume of the chamber, the gas pressure increases with the temperature of the chamber. Since the temperature of the emitting plasma is practically fixed (about 15,000 K, and attempts to raise this temperature are difficult, since they are accompanied only by an increase in plasma volume), and the pressure in the plasma is equal to the pressure in the chamber, the density of the emitting plasma increases with increasing pressure in the chamber, which means with an increase in the temperature of the chamber wall. An increase in the density of the emitting plasma leads to an increase in the volumetric luminosity of the emitting plasma and, as a consequence, to an increase in the brightness of the light source in a wide optical range, where the emitting plasma is practically transparent.

An increase in brightness can also be obtained by increasing the gas pressure at a given chamber temperature. However, in this case, the gas density and the refraction associated with this density will increase, which, with turbulent flow, both in the region of the emitting plasma and on the periphery, will lead to significant instability (fluctuations) in the brightness of the source.

In order for the relative brightness instability to be sufficiently small, $\sigma \leq 0.1\%$, the density of gas particles in the chamber is selected below the experimentally determined upper limit of $90 \cdot 10^{19}$ cm$^{-3}$, which corresponds to a gas pressure of 33.5 atm. at room temperature. At the same time, in order to obtain a spectral brightness of a light source close to the maximum achievable at the specified temperature, more than 50 MW /(mm$^2$·nm·sr), the gas pressure and, accordingly, the density of the emitting plasma must be high enough to ensure an optimal gas pressure of about 50 bar or more in steady-state operation. For this purpose, the density of gas particles in the chamber is selected above the experimentally determined lower limit of $46 \cdot 10^{19}$ cm$^{-3}$, which corresponds to a gas pressure at room temperature of at least 17 atm.

Thus, in order to ensure high spectral brightness and low relative brightness instability, the density of gas particles should be as low as possible, and the temperature of the inner surface of the chamber during operation should be as high as possible while ensuring a gas pressure in the chamber of about 50 bar or more.

In accordance with the invention, the use of inert xenon as a gas is preferable, which ensures safe operation and a long lifetime of the light source. In addition, in comparison with the emitting plasma of other inert gases, Xe plasma is characterized by the highest optical output in a wide spectral range, including UV, visible and near IR regions.

Preferably, a high-efficiency near-infrared diode laser is used as a CW laser 4. Choosing the preferred wavelength to choose from two wavelengths: 976 nm and 808 nm, high-efficiency diode lasers are due to the following factors. Strong Xe absorption lines lie near the laser wavelength of 976 nm, in which the lower state is populated as the temperature rises. Near 808 nm, such lines are further away from the absorption lines and, therefore, at a given laser power, sufficient absorption to sustain, an optical discharge is achieved at a higher plasma density and temperature than in the case of 976 nm.

Accordingly, in the preferred embodiments of the invention, the gas filling the chamber is xenon, and the CW laser has a wavelength of 808 nm.

In other variants, high-efficiency solid-state or fiber lasers can be used as a CW laser. In this case, the wavelengths of radiation from a CW laser and a solid-state laser system may be close or coincide.

Along with ensuring high stability of the output parameters, the present invention implements the possibility of achieving the greatest brightness of broadband laser-pumped light sources, in particular by optimizing the shape and size of an electrodeless chamber. Accordingly, in the preferred embodiments of the invention, the outer surface and the inner surface of either the chamber or its transparent parts have the shape of concentric spheres, and the region of the emitting plasma 2 is located in the center of these concentric spheres, FIG. 1. In this version of the invention, aberrations that distort the course of rays in the beam 5 of useful plasma radiation are eliminated, increasing its brightness.

To ensure the output of plasma radiation in a wide spectral range, from ultraviolet to near infrared, optically transparent parts of the chamber are preferably made of a material belonging to the group: crystalline magnesium fluoride ($MgF_2$), crystalline calcium fluoride ($CaF_2$), crystalline sapphire or leucosapphyre ($Al_2O_3$)), fused or crystalline quartz.

In general, the proposed invention makes it possible to ensure high reliability of plasma ignition sustained by laser radiation, and to create on this basis electrodeless high-brightness broadband light sources with the highest possible spatial and energy stability, as well as with the possibility of collecting plasma radiation at a spatial angle of more than 9 sr.

When performing the light source in the proposed form, the design is simplified as much as possible and the reliability of the means for laser ignition of plasma and the radiation source as a whole increases. Compared with the prototype, the problems of combining the foci of two pulsed laser beams and the separation of two active elements of the laser system during operation are eliminated. The limitations associated with the use of a dichroic mirror, usually used to inject several laser beams into the chamber, are removed. In general, when performing the light source in the proposed form, reliable ignition of this COD is achieved. Along with optimizing the conditions for sustaining COD, this makes it possible to create electrodeless high-brightness broadband laser-pumped light sources characterized by the highest possible spatial and energy stability.

INDUSTRIAL APPLICABILITY

High-brightness, highly stable laser-pumped light sources made in accordance with the present invention can be used in various projection systems, for spectrochemical analysis, spectral microanalysis of biological objects in biology and medicine, in micro-capillary liquid chromatography, for inspection of the optical lithography process, for spectrophotometry and other purposes.

What we claim is:

1. A laser-pumped plasma light source comprising: a gas-filled chamber (1), at least part of which is optically transparent, a region of radiating plasma (2) sustained in the chamber by a focused beam (3) of a continuous wave (CW) laser (4), and means for plasma ignition, characterized in that
the means for plasma ignition is a solid-state laser system (7) generating two pulsed laser beams (8), (9) that are focused into the chamber; one beam (8) of said two pulsed laser beams is generated in a free running mode and another pulsed laser beam (9) is generated in a Q-switched mode;
the solid-state laser system contains single active element (10), radiation source (13) for pumping the active element (10) and optical cavity (12), (13) that provides multiple passage of an intracavity laser beam (15) through the active element; the optical cavity is equipped with a Q-switch (14) installed on the path of the intracavity laser beam so that the Q-switch overlaps only part (15b) of a cross section of the intracavity laser beam.

2. The light source according to claim 1, wherein Q-switch (14) is a saturable absorber made of a chromium doped yttrium aluminum garnet crystal $Cr^{4+}$:YAG.

3. The light source according to claim 1, wherein Q-switch overlaps a small part (15b) of the cross section of the intracavity laser beam (15), no more than 30% of its area.

4. The light source according to claim 1, wherein pulsed laser beams (8), (9) and a beam (17) of CW laser are focused into the chamber by a focusing optical element (16) and the beam (17) of CW laser directed at the focusing optical element does not intersect the pulsed laser beams (8), (9), directed at the focusing optical element.

5. The light source according to claim 1, wherein a deflecting mirror (18) is mounted on the path of the beam of the CW laser (4) outside the path of the pulsed laser beams (8), (9).

6. The light source according to claim 1, wherein a deflecting mirror is mounted on the path of passage of pulsed laser beams outside the path of passage of the beam of the CW laser.

7. The light source according to claim 1, wherein output power of CW laser (4), sufficient to ignite and sustain the radiating plasma, is no more than 30 watts.

8. The light source according to claim 1, wherein an axis of the focused beam (3) of the CW laser is directed vertically upwards or close to the vertical, at an angle of no more than 10 degrees from it.

9. The light source according to claim 1, wherein a density of gas particles in the chamber is less than $90 \cdot 10^{19}$ $cm^{-3}$, which corresponds to a gas pressure at room temperature of 33 atm, and a temperature of an inner surface of the chamber is not less than 600 K.

10. The light source according to claim 1, wherein the temperature of the inner surface of the chamber is not more than 900 K, and the density of gas particles is not less than $45 \cdot 10^{19}$ $cm^{-3}$, which corresponds to a gas pressure at room temperature of 16.5 atm.

11. The light source according to claim 1, wherein the radiating plasma is characterized by high spectral brightness, more than 50 MW/($mm^2 \cdot nm \cdot sr$), and by a low relative instability of brightness σ, less than 1%.

12. The light source according to claim 1, wherein the gas belongs to a group of inert gases, including xenon, krypton, argon, neon or mixtures thereof.

13. A method for plasma ignition in a laser-pumped plasma light source comprising: directing a focused beam (3) of continuous wave (CW) laser (4) into a gas filled chamber (1), at least part of which is optically transparent, plasma ignition and stationary sustenance of a radiating plasma (2) by focused beam of CW laser, characterized in that
the plasma is ignited by a solid-state laser system (7) with single active element (10), which generates two parallel pulsed laser beams (8), (9) focused into the chamber; one beam (8) of said two pulsed laser beams is generated in a free running mode, and another pulsed laser beam (9) is generated in a Q-switched mode by an installed in an optical cavity Q-switch, overlapping only part (15b) of the cross section of the intracavity laser beam (15).

14. The method according to claim 13, wherein the pulsed laser beams and a beam of the CW laser are focused into a region intended for sustaining the radiating plasma (2) by a focusing optical element (16) and the beam (17) of the CW laser directed at the focusing optical element does not intersect the pulsed laser beams (8), (9) directed at the focusing optical element (16).

* * * * *